Aug. 29, 1961        E. H. LASS        2,997,822
PIPE-BEVELERS
Filed April 29, 1960        3 Sheets-Sheet 1
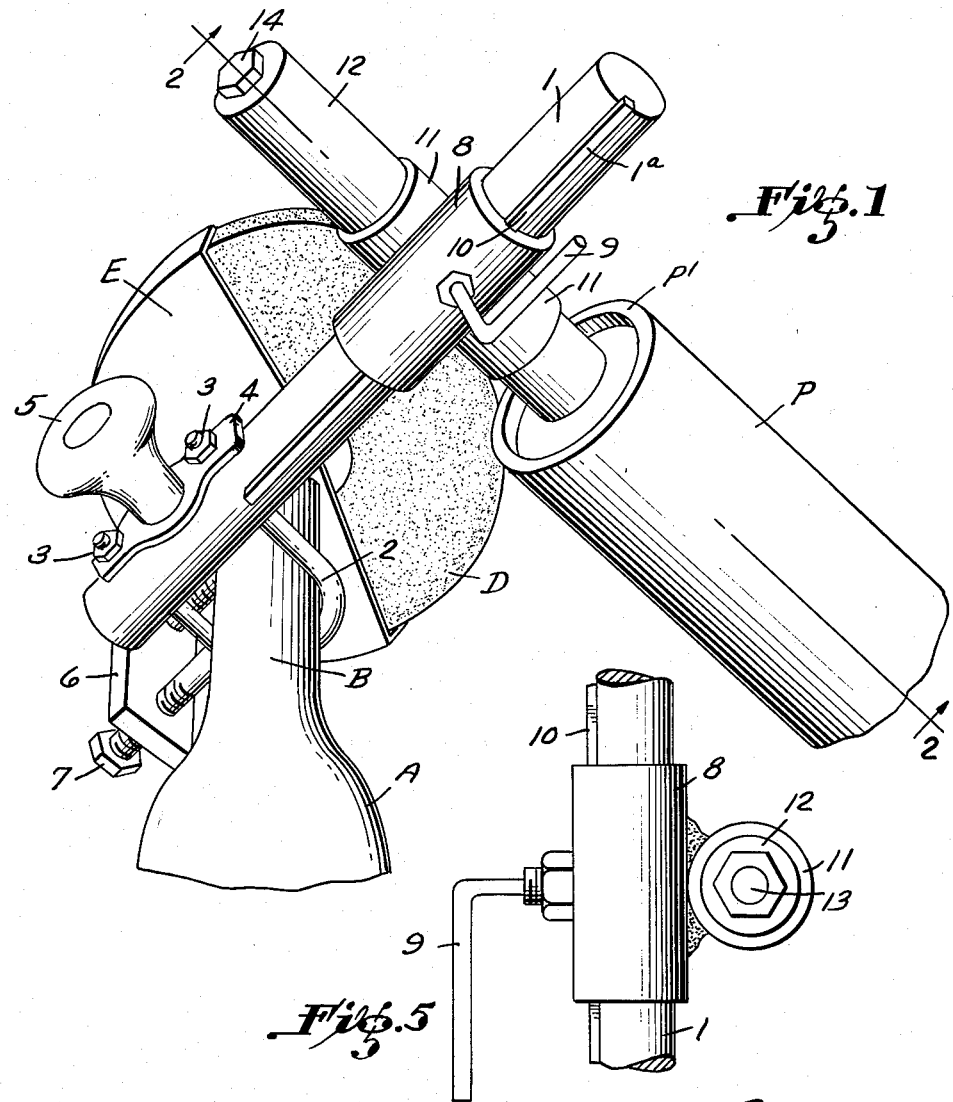
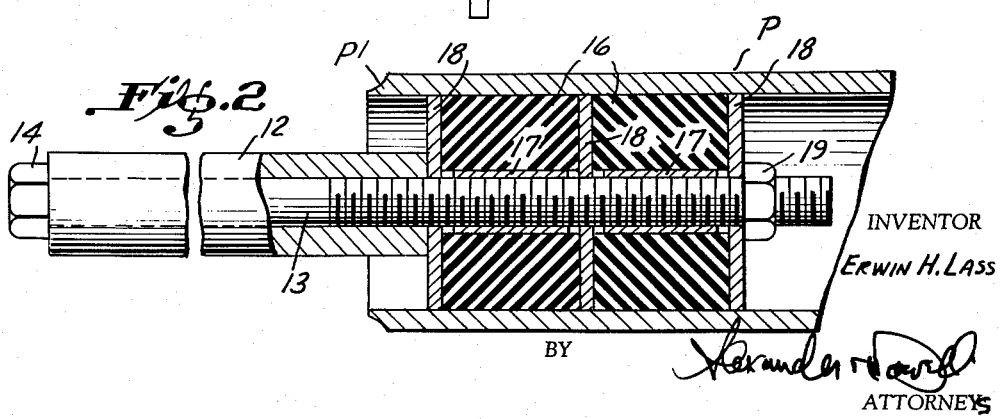
INVENTOR
ERWIN H. LASS
BY
ATTORNEYS Aug. 29, 1961  E. H. LASS  2,997,822
PIPE-BEVELERS
Filed April 29, 1960  3 Sheets-Sheet 2
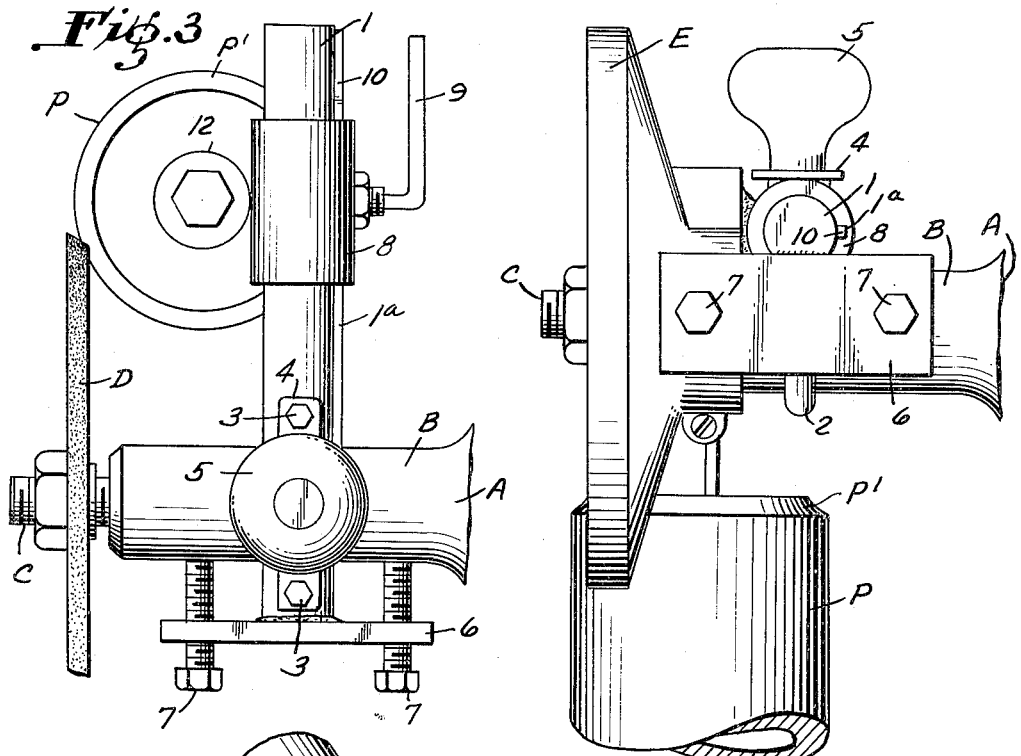
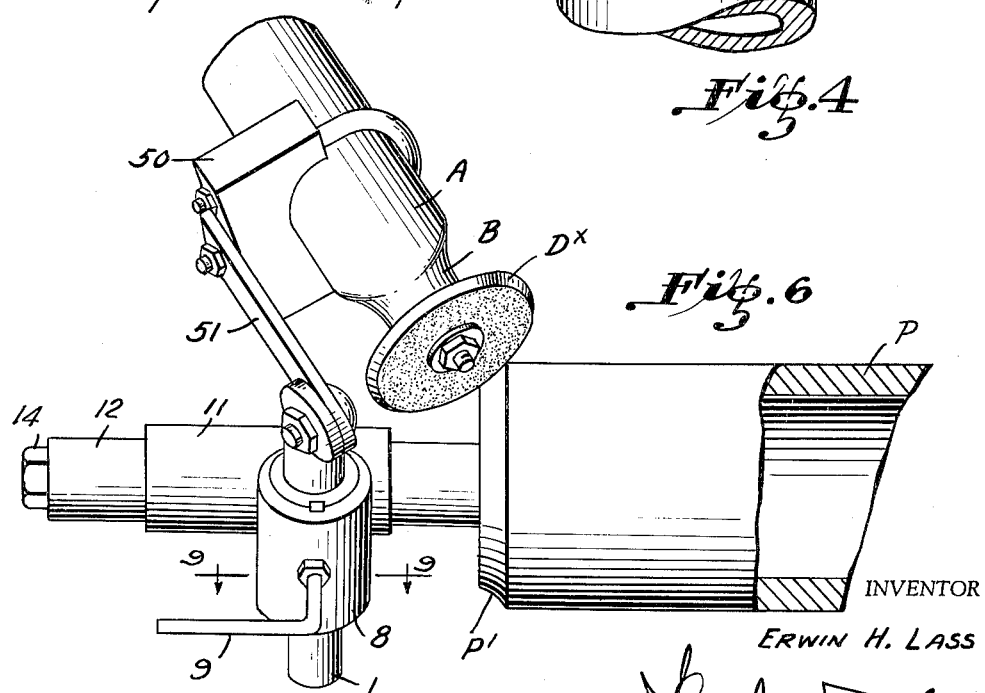
INVENTOR
ERWIN H. LASS
BY
ATTORNEYS Aug. 29, 1961     E. H. LASS     2,997,822
PIPE-BEVELERS Filed April 29, 1960     3 Sheets-Sheet 3

INVENTOR
ERWIN H. LASS
BY
ATTORNEYS 2,997,822
PIPE-BEVELERS
Erwin Henery Lass, 235 S. Oak, Blackfoot, Idaho
Filed Apr. 29, 1960, Ser. No. 25,687
10 Claims. (Cl. 51—241)

My invention is a novel pipe beveler adapted to be attached to any portable grinder, either air or electric, the beveler being adapted to bevel pipes of various sizes prior to welding operations, and my invention being particularly valuable for beveling stainless steel pipes, since the use of my beveler eliminates any necessity for filing the bevel of the pipe. It is preferred procedure to avoid filing of the beveled pipes for the reason that the carbon present has a tendency to defect the welds.

A principal object of my invention is to provide a beveler unit which may be fastened to the shaft of a straight pattern grinder, either air or electrically driven, in such a manner that the unit may be used on pipes which may be rotated or which are secured in fixed position.

A further object of my invention is to provide a pipe beveler of the above type which will speed-up the beveling process at least 75%, and which will produce a factory bevel which can not be obtained by the use of the conventional portable grinders; also to provide a pipe beveler in which a bevel may be obtained ranging from 20° to 60° by means of simple adjustments.

An important advantage of this beveler is that by setting a stop on the mandrel shaft when beveling, the operator can square off a length of pipe which has not been cut square, and can grind a land on a pipe which has been cut with an acetylene cutting torch. This will make a good fit for welding. This stop is also an important factor in salvaging pipes that have ends dented and have to be recut with a torch or saw. This stop can also be used with small peanut grinders in squaring off ends of pipe.

I will explain the invention with reference to the accompanying drawings which illustrate several practical embodiments thereof, to enable others familiar with the art to adopt and use the same; and will summarize in the claims the novel features of construction, and novel combinations of parts, for which protection is desired.

In said drawings:

FIG. 1 is a perspective view of my novel pipe beveler showing same attached to the shaft of a grinding wheel;

FIG. 2 is an enlarged section on the line 2—2 of FIG. 1;

FIG. 3 is a side elevation of the parts shown in FIG. 1;

FIG. 4 is a top plan view of the parts shown in FIG. 3;

FIG. 5 is a detail view;

FIG. 6 is a view showing a modification;

Figure 7:
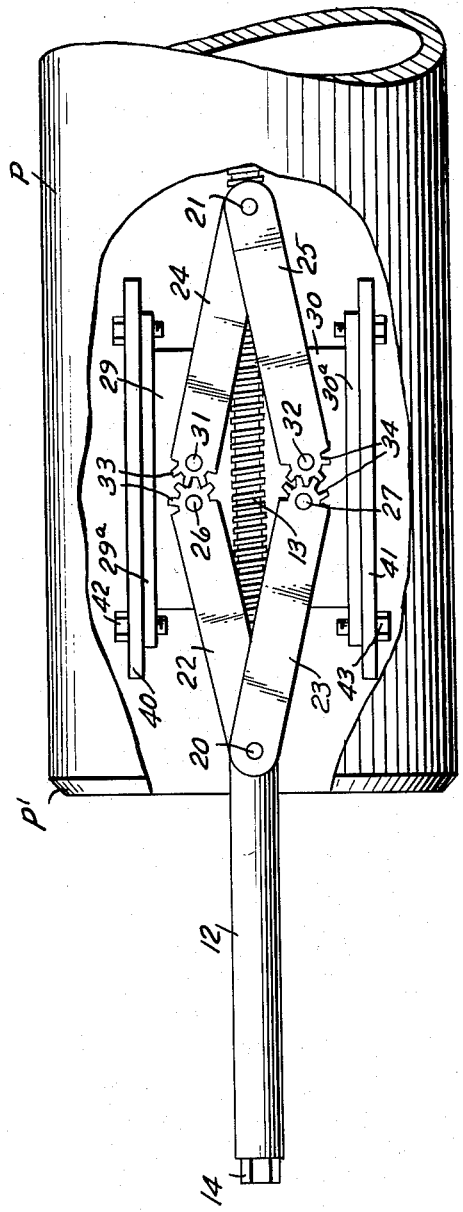
FIG. 7 is an elevation partly broken away, showing the method of mounting pipes of larger size to be beveled in the pipe beveler.
Figure 9:
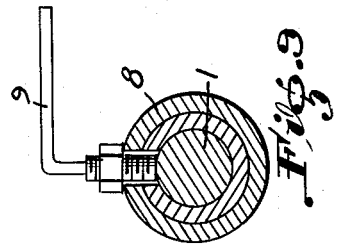
FIG. 9 is a detail section on the line 9—9 of FIG. 6.

As shown in FIG. 1, my beveling unit is adapted to be mounted upon the shaft extension of a portable straight pattern grinder, having an air or electric motor housing within casing A which has a shaft extension B at one end through which the shaft C of the motor, FIGS. 3 and 4, extends, the shaft C carrying on its outer end a grinding wheel D, the unit A—D being normally termed a straight pattern grinder. The grinding wheel D may be of Carborundum or emery or any other desired material, the straight pattern grinder A—D forming no part of my present invention. Preferably, the grinding wheel D may be covered with a guard E, FIGS. 1 and 4.

As shown in FIGS. 1 and 3, a shaft 1 extends at approximately 90° from the motor shaft housed in casing A, as shown in FIGS. 1 and 4, and has extending longitudinally thereof a keyway 1a, the shaft terminating adjacent to the extension B of the motor casing as shown in FIG. 1. A U-bolt 2 has its ends passing through spaced bores in the shaft 1, the outer ends of which are threaded and carry nuts 3, which also extend through a plate 4 seated upon the top of shaft 1, as shown in FIGS. 1 and 3, whereby the lower end of shaft 1 may be securely clamped to the casing extension B so as to extend therefrom at approximately 90° in any desired direction. Preferably plate 4 carries a knob 5 for purposes hereinafter described.

In order to adjust shaft 1 longitudinally with respect to extension B of the motor casing A, I provide a plate 6 secured to the shaft 1 and having tapped holes therein for the reception of adjusting screws 7 which are tapped into the bores in said plate 6, the inner ends thereof contacting the outer face of the extension B of the motor casing A. By the above construction, shaft 1 may be securely mounted upon extension B of motor casing A in adjusted position.

Slidably mounted upon shaft 1 is a collar 8 having an Allen screw and wrench 9, the collar 8 being tightened by Allen screw and wrench 9, whereby the collar 8 may be securely clamped on the shaft 1 in any adjusted position. The collar 8 has a key 10, FIGS. 1 and 5, fitting the keyway 1a in shaft 1, and a similar keyway in the bore of sleeve 8 to prevent rotation of sleeve 8 in shaft 1.

On the collar 8, offset laterally therefrom, is fixedly secured a bearing 11, FIG. 1, adapted to receive a hollow shaft 12 extending therethrough, and housing a screw bolt 13, FIG. 2, which is threaded throughout the major portion of its length and carries a head 14 at its outer end whereby the bolt 13, FIG. 2, may be related relatively to the hollow shaft 12. The opposite end of hollow shaft 12, from the head 14, is adapted to enter into the pipe P to be beveled, FIGS. 1 and 3, the screw bolt 13 also extending into the end of pipe P to be beveled, as shown in FIG. 2. By the above construction, bolt 13 which carries the pipe P to be beveled is disposed at substantially 90° with respect to the extension B of motor casing A, and further disposed 90° with respect to the axis of shaft 1, thereby positioning the end of pipe P to be beveled so that its end adjacent extension B will contact grinding wheel D, whereby its end P1 may be given the desired bevel by grinding wheel D.

In grinding pipes of smaller diameters such as the pipes having diameters in the range 1½, 2, 2½, 3 or 4″ the pipe P is inserted over the end of shaft 13 as shown in FIG. 2.

Expandible rubber mandrels or blocks 16 are provided on bolt 13 around metal washers 17 on bolt 13 and interposed between spaced washers 18, the bolt 13 passing through the outermost washer 18 and carrying a nut 19, FIG. 2, whereby as head 14 is tightened the rubber mandrels or blocks 16 will be expanded by compression between the innermost and outermost washers 18, thereby firmly maintaining pipe P to be beveled in proper relation upon bolt 13, giving an exact center for the pipe beveler. Obviously, the rubber mandrels or blocks 16 and washers 18 may be removed from shaft 13 and replaced by mandrels of proper size to conform with the dimensions of any pipe P whose end is to be beveled; different sizes of pipe P, of course, necessitating proper adjustment of the sleeve 8 on shaft 1, and the screws 7 on plate 6.

The rubber mandrels 16 are preferably made slightly smaller than the inside of pipe P to be beveled, so that when the rubber mandrels or sleeves 16 are extended, due to compression between the washers 18, by tightening the head 14, the shaft 13 will hold pipe P in proper position upon bolt 13, the sleeves 17 preventing the rubber mandrels 16 from binding too tightly onto the threads of bolt 13.

In order to change from a small diameter pipe P to a pipe of larger size, it is only necessary to slide bearing sleeve 8 up or down on the shaft 1, and thus by a slight adjustment of sleeve 8 on shaft 1 essentially any degree of bevel desired would be obtainable.

The handle 5 on each end of the grinder gives the operator full control of the grinder at all times as he rotates the same around the pipe P, thus making it possible to secure a satisfactory bevel.

The ever-increasing use of stainless steel makes my beveler exceptionally valuable since stainless steel can not be cut with a torch prior to welding, and of necessity has to be ground or machined.

Another advantage of my beveler is that will fit on any straight shank grinder, whether air or electrically driven.

By removing one of the rubber mandrels or discs 16 to shorten the mandrel, the operator can bevel T's and L's from salvage pipe. Also my novel grinder will speed up the beveling time by approximately 75%.

Figure 8:
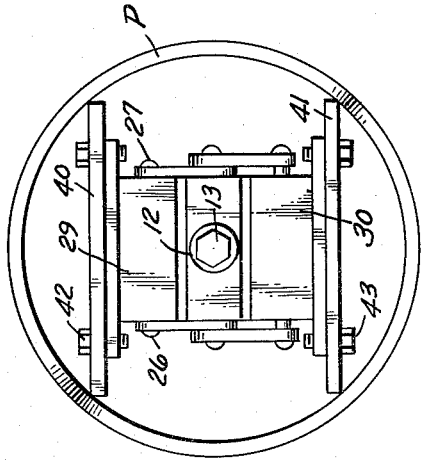
FIG. 8 is a transverse section through the modification shown in FIG. 7.

FIGS. 7 and 8 show a modification of the mandrels for holding larger sizes of pipes P in the sleeve 11 of the grinder. In this modification, the rubber mandrels 16 of FIG. 2 are not used, and the threaded shaft 13 in the hollow shaft 12 carries on its end remote from the head 14 a pin 21 secured to a nut which is threaded on the shaft 13; and on the ends of pin 21 are mounted pairs of toggle links 24 and 25, while on the end of the hollow shaft 12 adjacent the inner end thereof is mounted a pin 20 upon which is pivotally mounted the ends of toggle links 22 and 23. The opposite ends of toggle links 22 and 23 are mounted on pins 26 and 27 which are carried by blocks 29 and 30, while similarly the adjacent ends of toggle links 24 and 25 are mounted on pins 31 and 32 which are also mounted on the blocks 29 and 30, the adjacent ends of the links 22 and 24 carrying segmental gear teeth 33, and the adjacent ends of links 23 and 25 carrying segmental gear teeth 34 as shown in FIG. 7, whereby as the nut 14 is tightened, the toggle links 22–25 will be shifted to bring the blocks 29 and 30 closer to or further removed from the axis of shaft 13, said blocks 29—30 carrying heads 29a and 30a, respectively, to which plates 40 and 41 are secured by screws 42 and 43, said plates 40—41 being of such width that when the toggle links 22–25 are expanded, the edges of the plates 40 and 41 will engage the inner periphery of the larger-sized pipe P as shown in FIG. 8, to properly center the pipe P upon shaft 13.

Thus, for larger sizes I use the toggle or scissor-type mandrel shown in FIGS. 7 and 8 to replace the rubber-type mandrel shown in FIG. 2, the scissor or toggle-type mandrel being preferably used to mount pipes of sizes from 6" to 24" in my pipe beveler, the rubber-type mandrel being used to mount pipes of sizes from 1½, 2, 2½, 3 or 4" in the beveler. Both types of mandrel, however, operate from the shaft 1 in the same manner.

The scissor-type or toggle-type mandrel shown in FIGS. 7 and 8 is an improvement for larger pipe sizes over the rubber-type mandrel shown in FIGS. 1–5, since it is more economical and easier to secure in the pipes of larger sizes, as the rubber mandrel is difficult to compress in the larger sizes of pipes P.

As shown in FIG. 6, a modification is illustrated in which similar parts bear similar reference characters. FIG. 6 shows an added feature of the beveler, this modification comprising a small grinder Dx that attaches by means of clamp 50—51 on the same mandrel as the large grinder. By using a small wheel Dx on a small grinder, a J bevel or a hollow ground effect can be obtained which is often used on pipe in preparing for welding. The small grinder Dx shown in FIG. 6 rotates around the pipe in the same way as the large grinder.

By adjusting shaft 1 in or out, pipes of different sizes can be beveled.

I do not limit my invention to the exact forms shown in the drawings, for obviously changes may be made therein, within the scope of the claims.

I claim:

1. In combination with a grinder having a prime-mover housed in a casing provided with an extension for the prime-mover shaft, said shaft carrying a grinding wheel; a pipe beveler comprising a second shaft extending at approximately 90° to said extension; means for clamping the second shaft to said extension; a collar slidably mounted on said second shaft; means for fixedly clamping said collar on said second shaft; a bearing on said collar offset laterally therefrom and disposed at approximately 90° to the axis of the second shaft; a hollow third shaft extending through said bearing; a screw bolt journaled in said third shaft; a head on the outer end of the screw bolt engaging the outer end of the third shaft, the inner end of the third shaft being adapted to enter into a pipe to be beveled together with the screw bolt; means for mounting the pipe to be beveled upon said screw bolt with one end thereof engaging the grinding wheel; whereby relative rotation of the grinding wheel and the pipe to be beveled will cause the end of said pipe to be given the desired bevel.

2. In a combination as set forth in claim 1, said mounting means comprising rubber blocks on said screw bolt within the pipe to be beveled; spaced washers on said screw bolt interposed between the blocks, the inner end of the hollow third shaft and a nut on the screw shaft engaging the innermost washer; whereby tightening the said head will expand the rubber blocks between the washers, maintaining the pipe to be beveled in proper bevelling position.

3. In a combination as set forth in claim 2, sleeves on said screw bolt between the said washers to prevent binding of the rubber blocks on said screw bolt when the said blocks are expanded.

4. In a combination as set forth in claim 1, said mounting means comprising a pin transfixing the screw bolt disposed inwardly of the inner end of the hollow shaft; toggle links having their ends respectively hinged on said transfixing pin and on the inner end of said hollow shaft; blocks carried by the said toggle links within the pipe to be beveled, whereby as the head is tightened, the blocks on the toggle links will be shifted within the pipe to be beveled towards or from the axis of the screw bolt; and means carried by the said blocks adapted to engage the inside of the pipe to be beveled to center said pipe on the screw bolt as the blocks are expanded within said pipe.

5. In a combination as set forth in claim 4, the adjacent ends of the toggle links being pivotally mounted on said blocks, and carrying partial intermeshing gear teeth.

6. In combination with a grinder having a prime-mover housed in a casing provided with an extension for the prime-mover shaft, said shaft carrying a grinding wheel; a pipe beveler comprising a second shaft extending at approximately 90° from said extension and secured on said extension, said second shaft having a longitudinal keyway therein; means for adjusting the second shaft with respect to the said extension; a collar slidably mounted on said second shaft; means for fixedly clamping said collar on said second shaft; a key on said collar engaging said keyway; a bearing on said collar offset laterally therefrom and disposed at approximately 90° to the axis of the second shaft; a hollow third shaft extending through said bearing; a screw bolt journaled in said third shaft; a head on the outer end of the screw bolt engaging the outer end of the hollow third shaft, the inner end of the third shaft being adapted to enter into a pipe to be beveled together with the screw bolt; means for mounting the pipe to be beveled upon said screw bolt with one end thereof engaging the grinding wheel; whereby relative rotation of the grinding wheel and the pipe to be beveled will cause the end of said pipe to be given the desired bevel.

7. In a combination as set forth in claim 6, said mounting means comprising a series of rubber blocks on said screw bolt within the pipe to be beveled; spaced washers on said screw bolt interposed between the blocks, the inner end of the hollow third shaft and a nut on the screw shaft engaging the innermost washer; whereby tightening the said head will expand the rubber blocks between the washers, maintaining the pipe to be beveled in proper bevelling position.

8. In a combination as set forth in claim 7, sleeves on said screw bolt between the said washers to prevent binding of the rubber blocks on said screw bolt when the said blocks are expanded.

9. In a combination as set forth in claim 6, said mounting means comprising a pin transfixing the screw bolt disposed inwardly of the inner end of the hollow shaft; toggle links having their ends respectively hinged on said transfixing pin and on the inner end of said hollow shaft; blocks carried by the said toggle links within the pipe to be beveled, whereby as the head is tightened, the blocks on the toggle links will be shifted within the pipe to be beveled towards or from the axis of the screw bolt; and plates carried by the said blocks adapted to engage the inside of the pipe to be beveled to center said pipe on the screw bolt as the blocks are expanded within said pipe.

10. In a combination as set forth in claim 9, the adjacent ends of the toggle links being pivotally mounted on said blocks, and carrying partial intermeshing gear teeth.

References Cited in the file of this patent

UNITED STATES PATENTS

| | | |
|---|---|---|
| 1,495,000 | Cuthbertson | May 20, 1924 |
| 1,714,103 | Parks | May 21, 1929 |
| 2,188,720 | McQuade | Jan. 30, 1940 |
| 2,869,293 | Howard | Jan. 20, 1959 |
| 2,909,011 | Hendricks et al. | Oct. 20, 1959 |